United States Patent
Brandorff et al.

[11] Patent Number: 5,364,146
[45] Date of Patent: Nov. 15, 1994

[54] ROBOTIC GRIPPER FOR HANDLING OBJECTS OF VARIOUS SIZES

[75] Inventors: Alexander Brandorff, New Milford; Steven L. Smith, Oxford, both of Conn.

[73] Assignee: United Parcel Service of America, Inc., Atlanta, Ga.

[21] Appl. No.: 925,601

[22] Filed: Aug. 4, 1992

[51] Int. Cl.⁵ .............................................. B25J 15/08
[52] U.S. Cl. .................. 294/86.4; 294/103.1; 294/119.3; 294/907; 414/622; 901/39
[58] Field of Search .................. 294/63.2, 67.2, 67.22, 294/86.4, 86.41, 99.1, 103.1, 104, 119.1, 119.3, 902, 907; 414/621, 622, 729, 731, 741, 790.1, 796.9, 907; 901/31, 32, 36, 39

[56] References Cited

U.S. PATENT DOCUMENTS

| | | | |
|---|---|---|---|
| 2,589,101 | 3/1952 | Leguillon et al. | 294/63.2 X |
| 2,757,813 | 8/1956 | Adams | 294/104 X |
| 2,799,417 | 7/1957 | Morrell | 414/622 |
| 3,174,639 | 3/1965 | Chase et al. | 414/621 |
| 3,236,397 | 2/1966 | Lakin | 294/103.1 X |
| 3,242,576 | 3/1966 | Wheeler | 33/74 |
| 3,858,735 | 1/1975 | Zrostlik | 294/119.1 X |
| 4,055,258 | 10/1977 | Schneider | 414/796.9 X |
| 4,243,257 | 1/1981 | Schackleford | 294/103.1 X |
| 4,383,788 | 5/1983 | Sylvander | 294/67.22 X |
| 4,410,209 | 10/1983 | Trapani | 294/103.1 X |
| 4,541,771 | 9/1985 | Beni et al. | 294/86.4 X |
| 4,666,362 | 3/1987 | Landsberger et al. | 414/735 |
| 4,682,805 | 7/1987 | Reynolds | 294/907 X |
| 4,696,501 | 9/1987 | Webb | 294/86.4 |
| 4,746,255 | 5/1988 | Roccabianca et al. | 414/84 |
| 4,819,496 | 4/1989 | Shelef | 74/479 |
| 4,858,980 | 8/1989 | Dreisig et al. | 294/99.1 |
| 4,911,490 | 3/1990 | Akagawa | 294/907 X |
| 4,949,952 | 8/1990 | Hotkowski et al. | 414/907 X |
| 5,042,862 | 8/1991 | Tubke | 294/104 X |

*Primary Examiner*—Johnny D. Cherry
*Attorney, Agent, or Firm*—James A. Drobile; William H. Murray; Robert E. Rosenthal

[57] ABSTRACT

Robotic hand includes retractable paddles for supporting an article and a vertically-movable top paddle for engaging an upper surface of the article. The top paddle is mounted on an upper free end of a band of sheet-like material, which may be extended above the top surface of a housing of the robotic hand. Inflatable bladders in the retractable paddles have a relatively high coefficient of friction, and the top surface of the paddles has relatively low coefficient of friction. A force sensor may be provided in the lower surface of the top paddles.

21 Claims, 8 Drawing Sheets

5,364,146

ROBOTIC GRIPPER FOR HANDLING OBJECTS OF VARIOUS SIZES

BACKGROUND OF THE INVENTION

This invention relates to mechanisms for the gripping and handling of articles and in particular to robotic hands or grippers.

In the handling of articles by machine, it is conventional to provide a member at the end of an arm for gripping the article. Such a gripping member is often referred to as a robotic hand. In the handling of packages and parcels being shipped by common carriers, particular demands are placed on the robotic hand. The majority of such packages and parcels are generally rectangular. However, the size of the packages varies. Consequently, the robotic hand must be able to grip packages of various sizes.

Packages and parcels often contain fragile or poorly-packed items. Any sudden movements or bumps can result in damage to the contents of the package. As a result, it is important that the robotic hand be capable of picking up and setting down the packages as gently as possible.

Package walls are frequently made from low-quality materials, or have been reused, and have hence become weak. Thus, there is a danger that a gripping force will damage or even rupture the package walls. Accordingly, the robotic hand must be able to grip packages securely without exerting more force than necessary.

Packages that are being shipped must be loaded and unloaded from stacks of packages, or nests, within the confined space of a trailer or shipping container. In such a confined space, it is important to stack packages with a minimum of wasted volume. Consequently, packages are stacked quite closely. It may be necessary to reach between packages in order to place packages of various sizes. Small packages may be stacked near walls or a ceiling of the shipping container or trailer. As a result, the hand must be able to maneuver in the vicinity of the wall or ceiling of the container.

It is accordingly an object of the invention to provide a robotic hand which fulfills the above objectives.

It is specifically an object of the invention to provide a robotic hand which can be maneuvered in small spaces in the interior of trailers and cargo containers.

It is a further object of this invention to provide a robotic hand that can gently handle packages within the confined environment of a trailer or cargo container.

It is a further object of this invention to provide a robotic hand that can easily engage and disengage articles but can carry articles securely.

Further objects and advantages of this invention will become apparent from the detailed description of a preferred embodiment which follows.

SUMMARY OF THE INVENTION

A robotic hand according to the invention has means for supporting an article, and means for engaging a top of an item supported on the article support means. The engaging means is mounted on a free end of a vertically-movable support means.

DETAILED DESCRIPTION OF A PREFERRED EMBODIMENT

Figure 1:
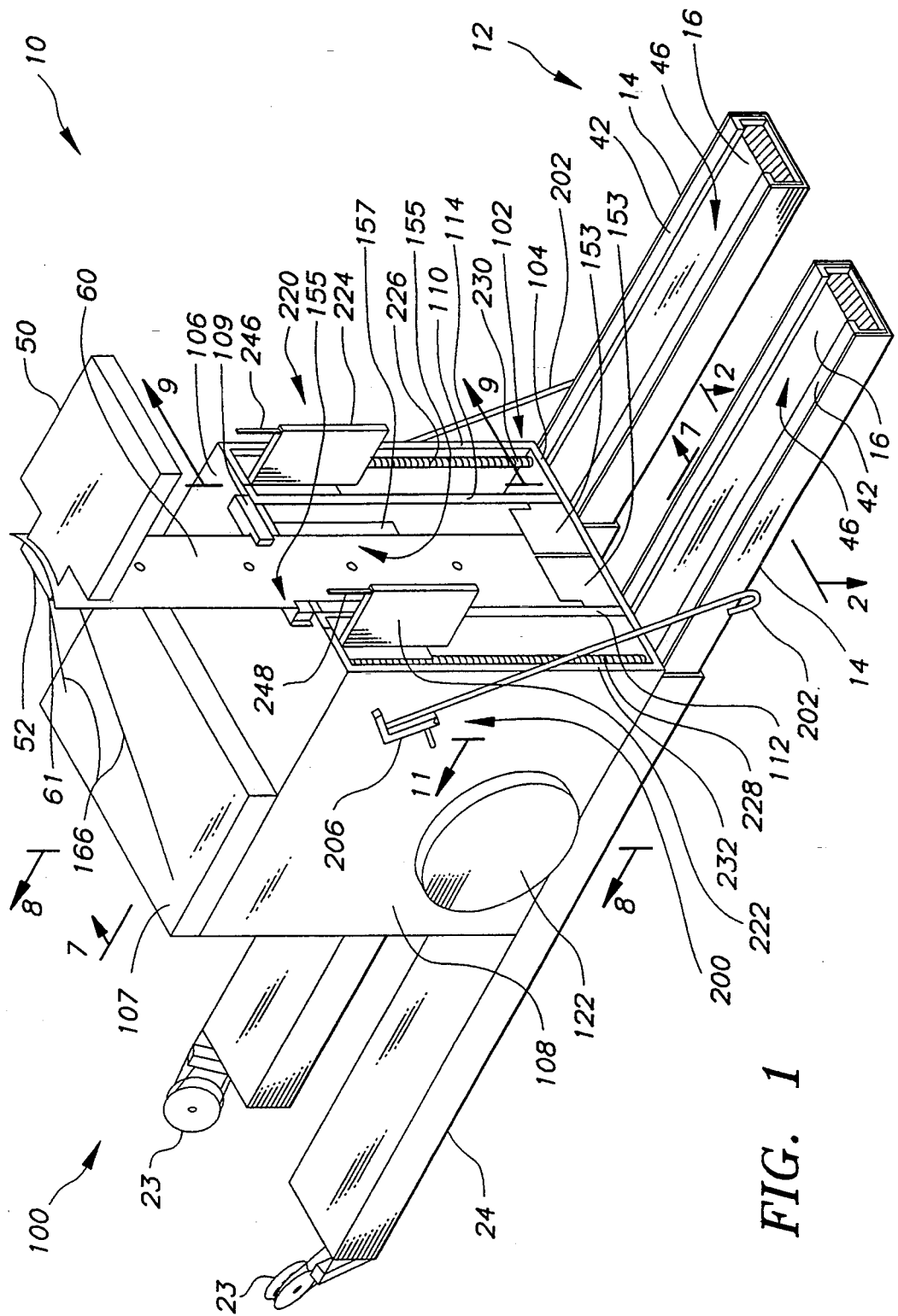
FIG. 1 is a perspective view of a robotic hand according to the invention.

Referring to FIG. 1, there is depicted a robotic hand 10 according to the invention. Support means 12 are provided. Support means 12 is made up of a pair of identical paddles 14. The top surfaces of the two paddles 14 lie in a plane. The paddles 14 thus provide a substantially planar surface for supporting an article.

Engaging means for engaging an upper surface of an item or support means 12 is provided directly above support means 12. The engaging means comprises a top paddle 50. Top paddle 50 is a substantially rectangular planar member, having a substantially planar bottom surface aligned substantially parallel to the planar article supporting surface defined by support means 12. A rectangular box or package placed on support 12 may be gripped by top paddle 50. Top paddle 50 serves to prevent a box or package supported on lower support 12 from tipping or sliding while the robotic hand is moving.

Top paddle 50 is mounted on band or top paddle support member 60 at an upper end or free end 61 thereof. Top paddle support member 60 is movable vertically. The rearward edge of top paddle 50 is connected to top paddle support member 60. Top paddle support member 60 is preferably in the form of a long band of thin sheet metal which is slightly curved about an axis parallel to its axis of extension.

Figure 5:
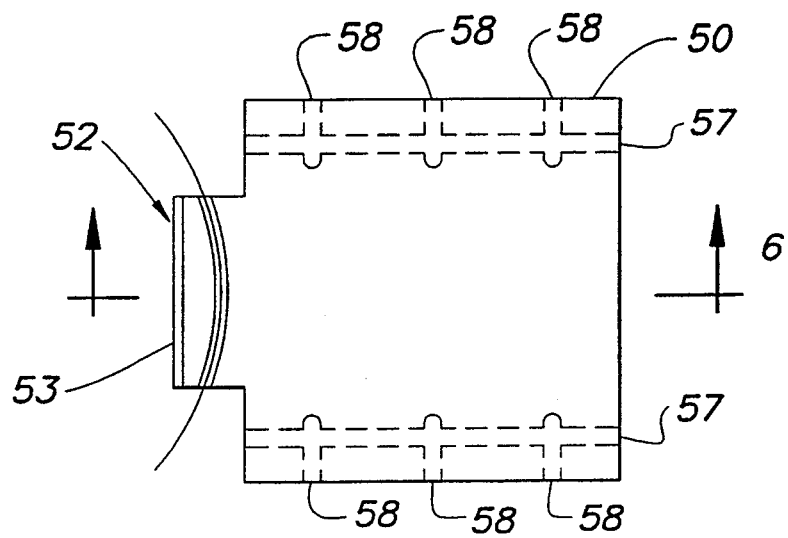
FIG. 5 is a top view of a top paddle according to the invention.
Figure 6:
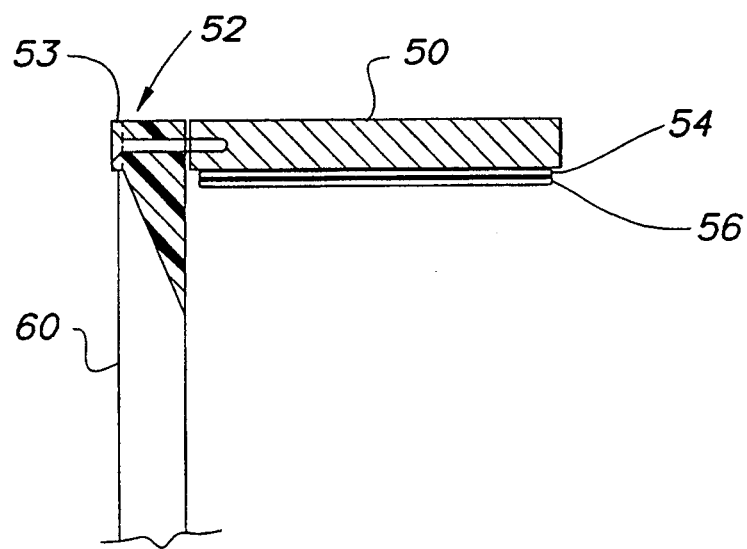
FIG. 6 is a sectional view, taken along line 6—6 of FIG. 5, of a top paddle according to the invention.

Referring to FIGS. 5 and 6, top paddle 50 comprises a rearward extension having a vertical concave rear wall. Band or top paddle support member 60 is provided in contact with the concave rear wall. Stiffener 52 is provided on the rearward side of band 60. Stiffener 52 comprises a convex vertical forward wall that mates with the concave vertical rear wall of top paddle 50 and extends downward beyond the lower surface of top paddle 50. Stiffener 52 may be comprised of a hard plastic, with metal plate 53 provided on one side thereof to support a fastener head. A horizontal threaded boss is preferably provided through stiffener 52 with a horizontal threaded boss formed in alignment therewith in the rear wall of top paddle 50. A fastener may then be provided through stiffener 52, band 60, and into top paddle 50.

Horizontal holes 57, shown in dashed lines in FIG. 5, are provided from front to back of paddle 50. Top paddle guide cables 166 are disposed through the horizontal holes 57. Additional threaded horizontal holes 58, also shown in dashed lines in FIG. 5, normal to horizontal holes 57, extend inward from the sides of the paddle to horizontal holes 57. Screws (not shown) are preferably inserted in horizontal holes 58 to hold top paddle guide cables 166 in place.

On the lower surface of top paddle 50 there is provided an Interlink force sensing resistor in the form of a film 54. A pad 56 is provided on the lower surface of film 54 for protection of the film. The film 54 detects the pressure between top paddle 50 and a box. Conventional electrical connections (not shown) are provided so that the changes in resistance of film 54 are provided to the control means.

Referring to FIG. 1, housing 100 is provided in the form of a substantially rectangular box. Housing 100 has a base plate 104, top 106, sides 108 and 110, and internal vertical walls 112 and 114. The top paddle support member 60 extends from a generally front face. Consequently, top paddle 50 extends forward of the front face 102 of the housing 100. The top paddle also extends above the top of the housing 100. This construction permits the robotic hand according to the invention to grip packages that are taller than the height of the housing 100. The support means 12 can be brought as close to the roof of a container as the height of the housing 100. This provides a large degree of flexibility in use of the gripper.

The support means 12 will now be explained in detail with reference to FIGS. 2-4. Support means 12 comprises two paddles 14. Paddles 14 extend in parallel spaced relationship forward of the front face of housing 100. The two paddles 14 are each generally rectangular in section. The two top surfaces 42 of the paddles together constitute a top surface of support means 12.

A longitudinal slot 46 is provided extending substantially the length of each paddle and opening through the center of the top surface thereof. Longitudinal slot 46 enables the provision of a bellows or bladder 16 to serve as a selectively-engagable support means having a relatively high coefficient of friction. A bellows or bladder 16 is housed in each slot 46. In a preferred embodiment, the bellows 16 is made of inflatable flat tubing, such as conventional garden hose composed of a vinyl casing and nylon reinforcing fibers. The upper side of each bellows 16 preferably has high friction material 17 applied thereon. For example, high friction gripper pad material may be obtained from the Barry W. Wright Company, such as stock no. GP706-2A.

Figure 2:
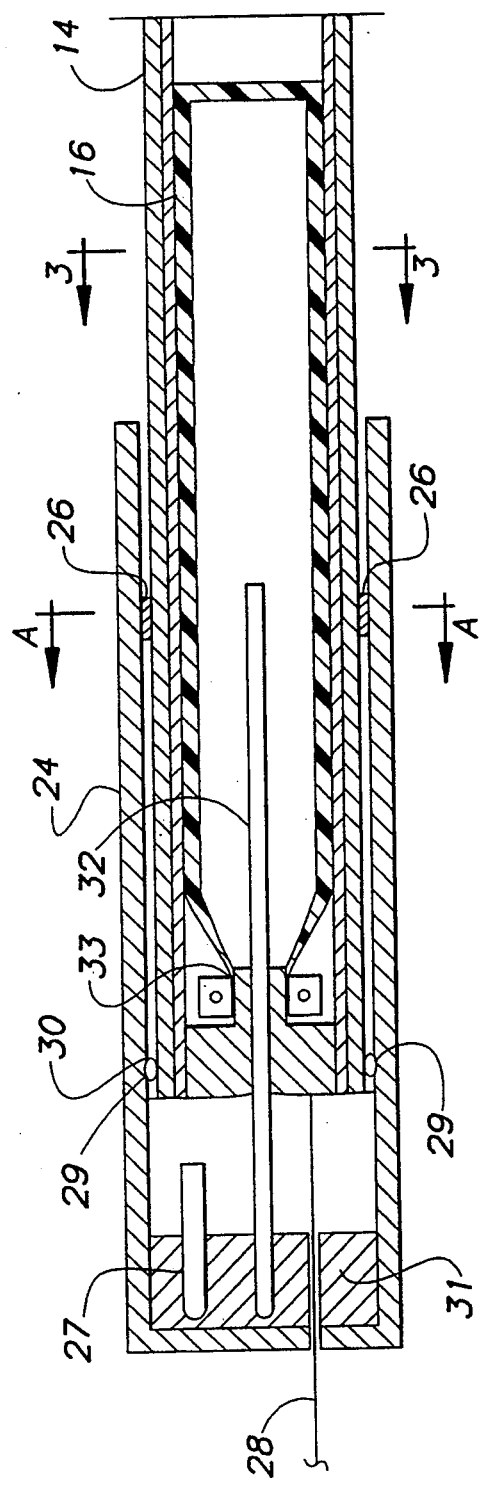
FIG. 2 is a sectional view, taken along line 2—2 of FIG. 1, of a support means of a robotic hand according to the invention.
Figure 3:
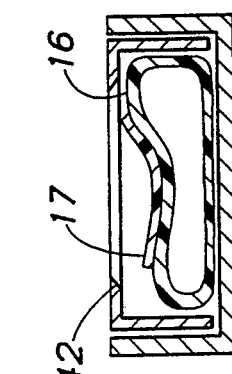
FIG. 3 is a sectional view, taken along line 3—3 of FIG. 2, of a support means according to the invention showing bellows in a deflated mode.

Referring to FIG. 2, a trombone-type slide assembly 30 at the rear end of each bellows 16 connects the bellows to an air line 32. A plastic block 31 is provided, with a horizontal bore therein, through which air line 32 is disposed. A projection from a forward face of slide assembly 30 has an end of bellows 16 secured thereon by means of a clamp 33. Bellows 16 is thus in physical communication with air line 32. A valve for pressurization and venting of each air line 32 is provided at a remote location. When the bellows is in a low pressure mode, as shown in FIG. 3, the bellows is deflated. Hence, the top surface of high friction surface 17 is below the level of top surface 42 of paddle 14. Accordingly a box will rest on the top surface 42 of the paddle 14. The top surface of the support means thus comprises a low friction contact surface. This provides low friction contact between the support means and a box. Low friction contact is advantageous when picking up and setting down a box. When picking up a box, the paddles slide under the lower surface of the box. When the support means are retracted, they slide rearward and out from under the lower surface of the box.

Figure 4:
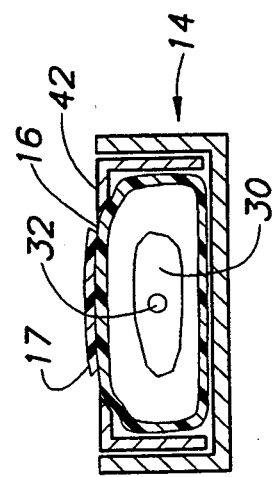
FIG. 4 is a sectional view, taken along 3—3 of FIG. 2, of a support means according to the invention in an inflated mode.

When the bellows is in an inflated mode, the box is supported by the high friction gripper pad material 17 on the top of the bellows as shown on FIG. 4. This may be referred to as engaging the high-friction support means. Consequently, the box will tend not to slide on support means 12 when the bellows are inflated. When the robotic hand is moving, the bellows are preferably inflated. This provides a relatively high coefficient of friction between the lower support means and the box.

The bottom surface of support means 12 preferably also has a low coefficient of friction. This permits the support means to slide easily on top of a first box when placing a second box on the first box. In a preferred embodiment, the paddles 14 are made of treated aluminum 6063T52 with Teflon impregnated anodize surface treatment. Thus, both bottom and top surfaces are low-friction surfaces. Each paddle 14 is made of top and bottom sections. Fasteners, which may be screws, are employed to hold the top and bottom paddle sections together.

Referring particularly to FIG. 2, each paddle 14 is mounted in a paddle cylinder 24. Paddle cylinders 24 are secured by brackets 25 to housing 100. Each paddle cylinder 24 extends rearward from housing 100. It is preferable that the forward edge of each paddle cylinder 24 be no farther forward than the face 102 of housing 100. This permits a box to be supported on paddles 14 with one face of the box abutting on the face 102 of housing 100. This also permits complete retraction of paddles 14 so that they do not extend forward of the housing face 102. This allows easy maneuverability of the hand in close spaces.

Figure 2A:
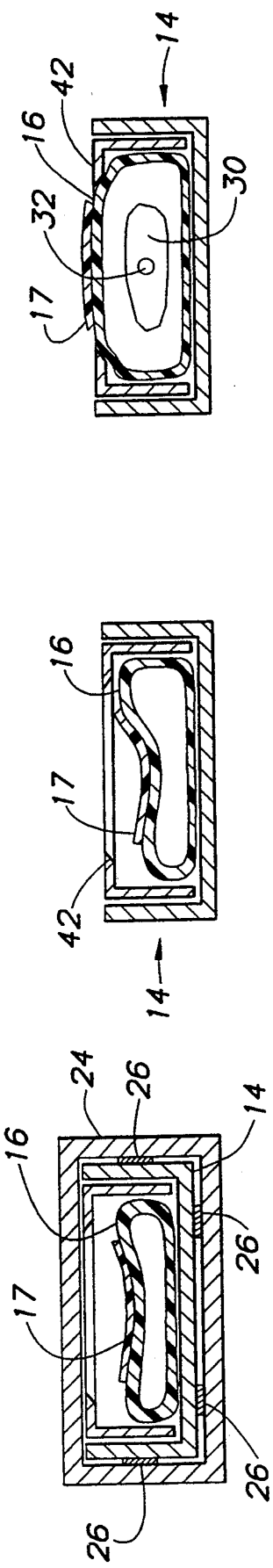
FIG. 2A is a sectional view, taken along line A—A of FIG. 2, of a support means according to the invention.

Referring to FIG. 2A, each paddle cylinder 24 is substantially rectangular in section. Two bearing pads 26 are mounted on the lower interior surface of each paddle cylinder 24. Bearing pads 26 are substantially planar and circular in plan. Each paddle 14 rides on corresponding bearing pads 26. Paddle cylinders 24 are in a preferred embodiment made of an extruded rectangular cylinder of 6063-T5 aluminum having a Teflon impregnated anodize surface treatment. In a preferred embodiment, bearing pads 26 are of acetal.

Referring again to FIG. 2, the paddles are extended by using the cylinder as a piston cylinder. A pressurized air line inlet 27 is provided at a rear end of each cylinder 24. A rubber lip seal 29 is provided about a rear end of paddles 14. When paddle 14 is in a retracted position, air is introduced into cylinder 24 through air line inlet 27. This has the effect of driving paddle 14 outward. The introduction of air into cylinder 24 is controlled by a valve on an air line that is in physical communication with the interior of sleeve 24 through inlet 27.

Retraction and locking of paddles is accomplished through cable 28 attached to the rear end of each paddle 14. Cable 28 is provided about pulleys 23 at the rear of each paddle cylinder 24. Cable 28 is driven in a preferred embodiment by an air cylinder (not shown) which is preferably mounted in another part of the robotic arm. Cable 28 is retracted when it is desired to retract paddle 14 in cylinder 24. Cable 28 is locked when paddle 14 is fully retracted, or may be locked at any intermediate position. Cable 28 is released before the extension of the paddles 14.

Figure 7:
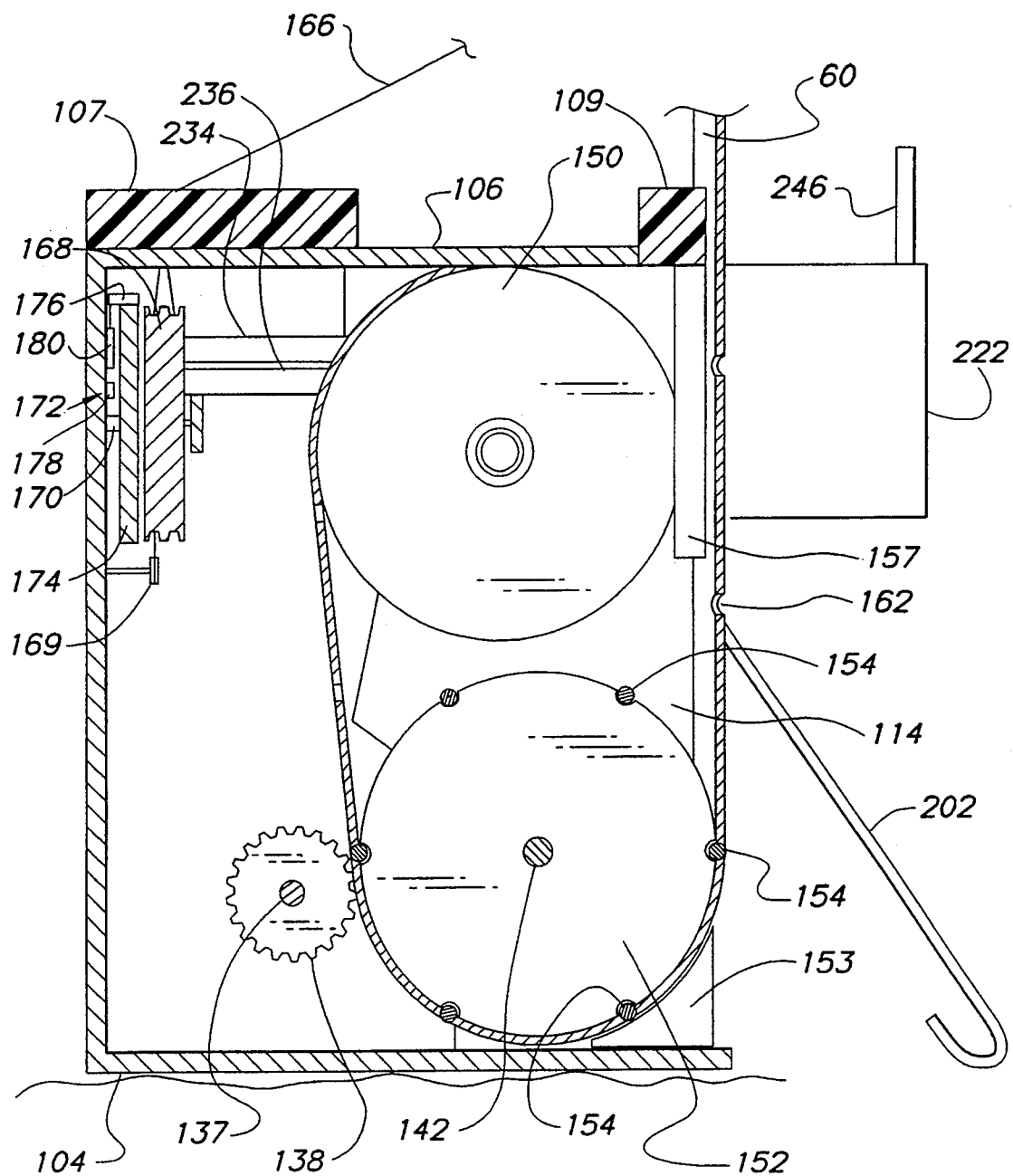
FIG. 7 is a partial sectional view, taken along line 7—7 of FIG. 1, of a robotic hand according to the invention.
Figure 8:
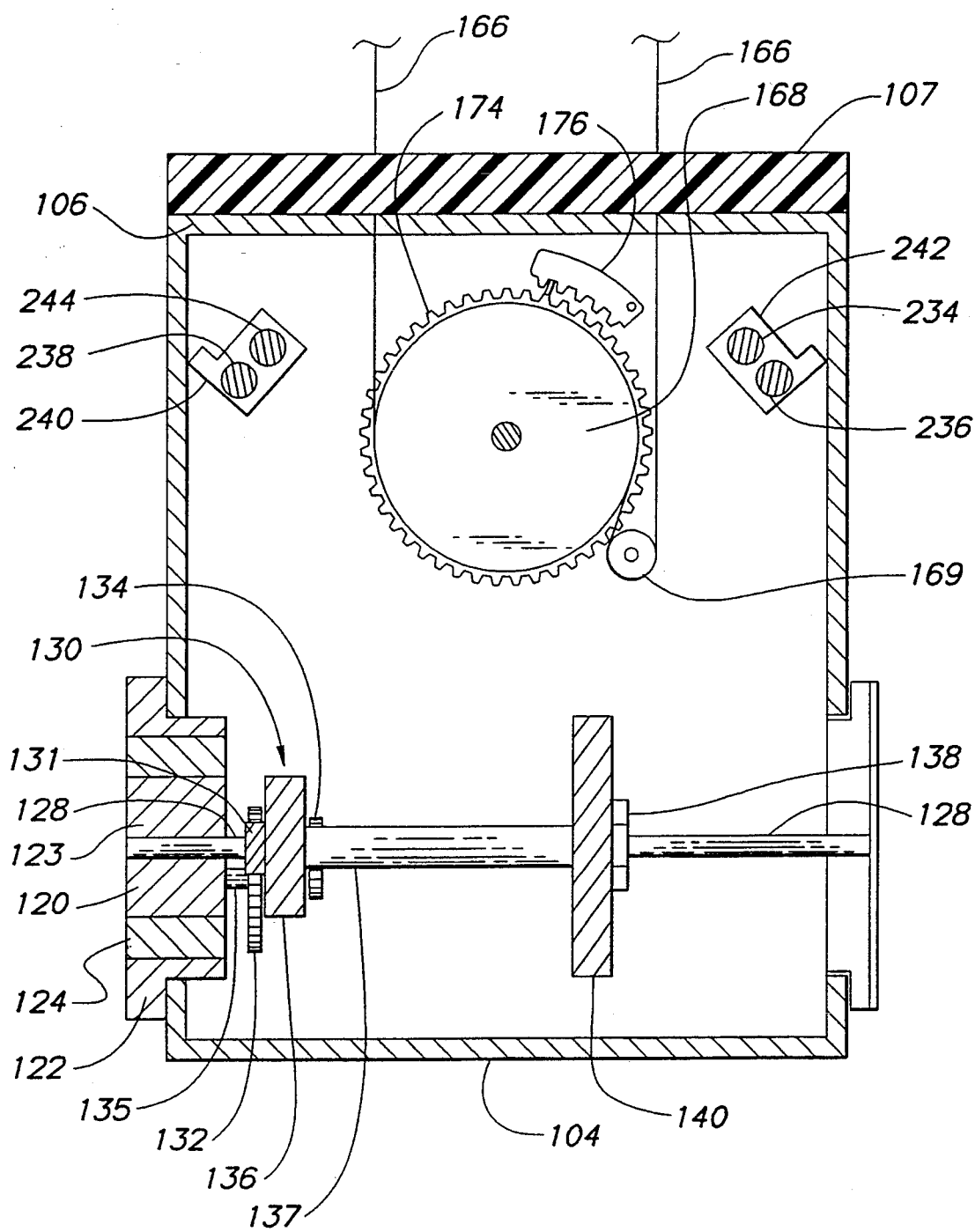
FIG. 8 is a partial sectional view, taken along line 8—8 of FIG. 1, of a robotic hand according to the invention.
Figure 9:
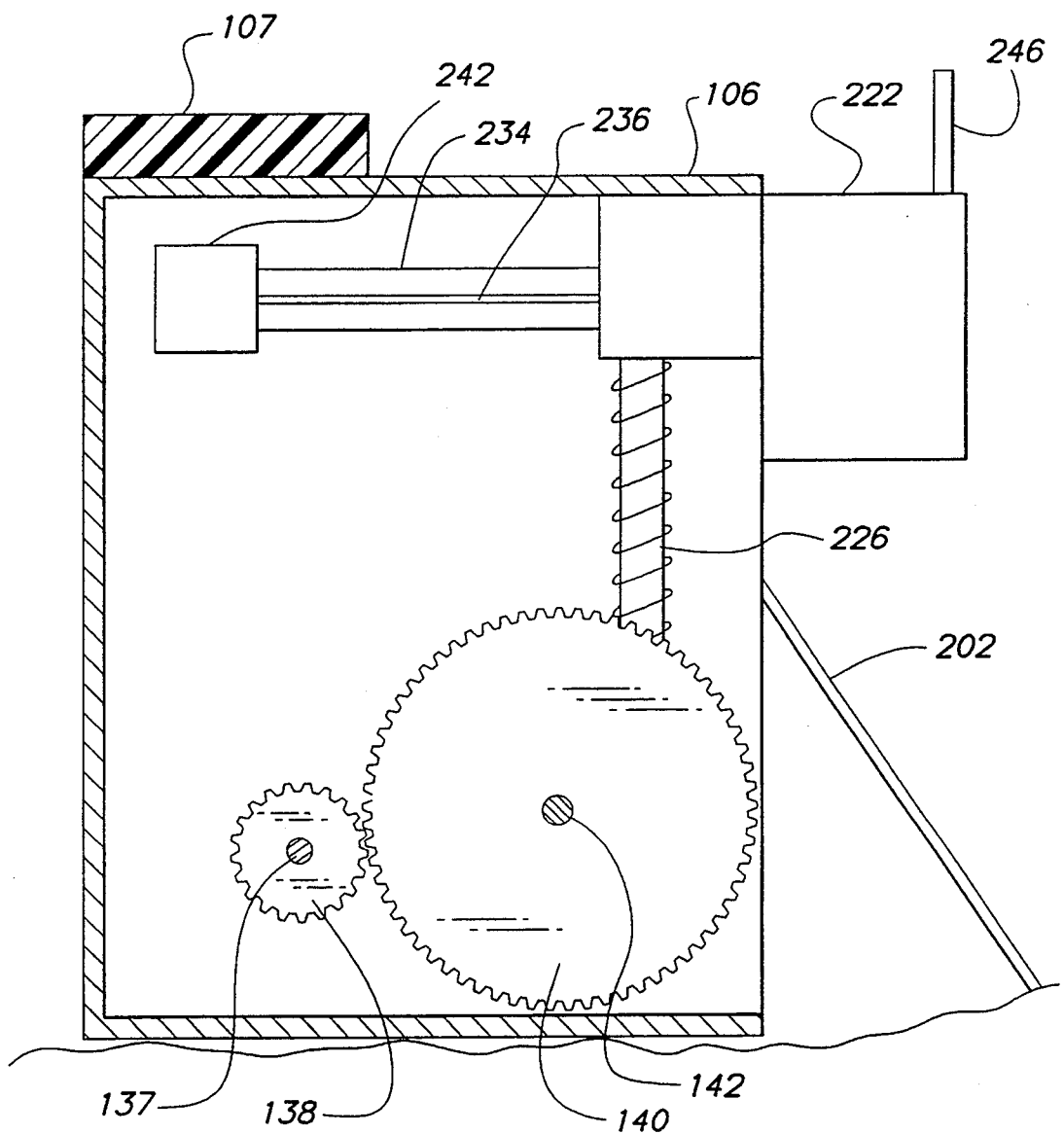
FIG. 9 is a partial sectional view, taken along line 9—9 of FIG. 1, of a robotic hand according to the invention.

Referring to FIGS. 7–9, there is provided an apparatus, including motor 120, gearing 130, and drive spool 152, for driving band 60. As noted above, band 60 is capable of vertical translation above the top of housing 100.

Motor 120 is mounted within the housing 100. Motor 120 is an electric motor. Stator 124 of motor 120 may be bonded into a substantially cylindrical stator housing 122 projecting outward from first side panel 108 of housing 100. A shaft 128 is provided horizontally across the housing coaxial with the cylindrical stator housing 122. The rotor 123 of the motor is mounted on the shaft 128 interior to stator 124. In a preferred embodiment, motor 120 has a peak torque of 60 ounce-inches, a maximum speed in use of 4840 revolutions per minute and a total weight of 5.5 ounces. Good results have been achieved using a rotor purchased from Magnetic Technology of Canoga Park, Calif. Model No. 2375E-050.

Gearing 130 operatively connects the motor means 120 to the means for driving the engaging means support. Gearing 130 includes motor gear 131 mounted on the rotor shaft 128. First gear 132 engages with motor gear 131 and is mounted on second shaft 135. Second gear 134, is also mounted on second shaft 135. Second gear 134 engages with third gear 136. Third gear 136 is mounted on third shaft 137. Third shaft 137 is coaxial with the motor shaft, and extends partially across housing 100. Fourth gear 138 is also mounted on third shaft 137. Fourth gear 138 meshes with final gear 140. Final gear 140 is mounted on drive shaft 142, as is drive spool 152.

Band 60 is coiled around recoil spool 150 and driven by drive spool 152. Recoil spool 150 is mounted in an upper part of the front of housing 100. Recoil spool 150 has a tension spring inside it which is configured to cause recoil spool 150 to cause the band to be coiled about the recoil spool. Thus, recoil spool 150 is not driven. Band 60 is driven by drive spool 152. Drive spool 152 is driven by motor 120 through gearing 130. Final gear 40 of gearing 130 has a common drive shaft with drive spool 152. Drive spool 152, as may be seen, is mounted in the lower forward portion of the housing 100. Top paddle 50 may travel vertically along the front face of housing 100 down to the drive spool 152. As explained below, top paddle 50 engages panels 222, 224, to permit engagement of packages having a height less than that of the housing 100. Drive spool 152 is mounted below recoil spool 150. Thus, the band is partially about the exterior of drive spool 152. Drive spool 152 is substantially cylindrical, having carbide balls 154 protruding from a central part of its curved side surface. Each carbide ball 154 is spaced apart equally from the next nearest carbide ball 154. Holes 162 are provided in a line along the center of the band. Holes 162 are spaced equally from one another. The distance between adjacent holes 162 is the same as the distance between adjacent carbide balls 154. Accordingly, carbide balls 154 engage holes 162 so as to provide a non-slipping engagement between drive spool 152 and band 60.

Guidance of band 60 is further provided by blocks 153 having cylindrical faces opposite drive spool 152 at a lower portion of the front face of housing 100. Slots 155 are defined by block 109, and members 157 protrude inward from forward edges of vertical walls 112, 114, to receive edges of band 60.

With reference to FIG. 1, two support cables 166 extend downward and rearward from the top paddle to the rear of the top of the housing. In a preferred embodiment, each support cable 166 is of stainless steel covered with nylon, rated at 300 pounds tension load. A plastic block 107 on top 106 of housing 110 has holes provided therein for the passage of cables 166. With reference to FIGS. 7 and 8, the support cables 166 are wound around a cable recoil pulley 168 which is rotatably mounted on a rod 170 in the upper center of the rear housing wall. One of the cables 166 is disposed about a direction change idler pulley 169 disposed adjacent cable recoil pulley 168. Cable recoil pulley 168 has a recoil spring, so that cables 166 are retracted as top paddle 50 is lowered. A cable brake 172 is provided on cable recoil pulley 168. Cable brake 172 includes recoil cable pulley gear 174 rigidly mounted on cable recoil pulley 168. A spur gear segment 176 is pivotally mounted on rear housing bracket 178. A piston of paddle cable brake gear cylinder 180 is operably engaged with spur gear segment 176. By operation of air cylinder 180, spur gear segment 176 is caused to rotate between a first position where it is engaged with the teeth of pulley gear 174 and a second, retracted position shown in FIG. 8. Thus, the motion of pulley gear 174 may be stopped, thereby stopping the movement of recoil pulley 168. This locks cables 166, whereby top paddle 50 is held in position.

Figure 11:
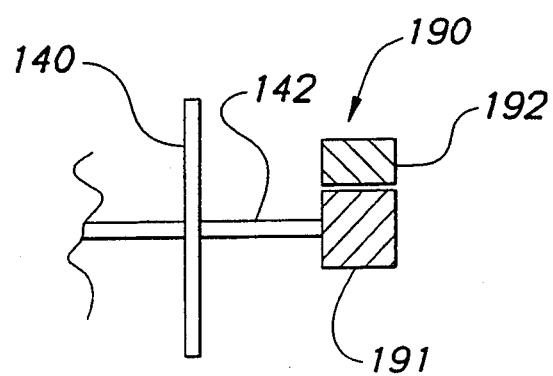
FIG. 11 is a partial sectional view, taken along line 11 of FIG. 1, of a robotic hand according to the invention.

Position information relating to upper engaging means 0 is provided by upper engaging means position sensing means. Referring to FIG. 11, position sensing means includes a home sensor 164 and motion monitoring means 190. Home sensor 164 is a device that is capable of detecting the end of band 60. Home sensor 164 provides a signal when it detects the end that indicates that the top paddle 50 is in a home position. In a preferred embodiment, home sensor 164 is a proximity sensor. Home sensor 164 may be a proximity sensor made by Turk, Model No. Bi 0.8-H 04-AN 6X.

Referring to FIG. 11, means for monitoring the movement of the top paddle during operation is provided by means 190 for monitoring the motion of drive spool 152. Motion monitoring means 190 is located adjacent to final gear 140 in the lower front portion of the housing. In a preferred embodiment, a code wheel 191 is mounted on drive shaft 142. An encoder sensor 192 is provided in association with code wheel 191 for monitoring the position thereof. For example, a code wheel, such as Hewlett-Packard Model HEDS 5100, with 360 lines may be used, with a two channel optical incremental encoder module, having a lensed LED light source and a detector integrated circuit, such as Hewlett-Packard, Model No. HEDS-9100.

Secondary engaging means 220 is provided on the front face of housing 100. Secondary engaging means 220 are necessary because top paddle 50 cannot travel downward to grip packages having very low height. Thus, secondary engaging means 220 is provided to engage the top surface of packages of low height. Secondary engaging means 220 comprises right panel 222 and left panel 224. Each panel 222, 224 may be substantially a rectangular piece of plastic. Each panel 222, 224 is vertically movable on one of two vertical support rods 226, 228. Each vertical support rod 226, 228 is spaced immediately rearward of the open front face of housing 110, spaced inward of each sidewall. Referring to FIG. 9, springs 230, 232 are provided about support rods 226, 228 so that the panels 222, 224 are spring-loaded to return to the upper end. Two of horizontal support rods 234, 236, 238, 240 project horizontally rearward from each of panels 222, 224. Each pair of support rods 234, 236 and 238, 240 is attached at its rearward end to a V-shaped support block 242, 244. V-shaped support blocks 242, 244 provide additional stability for panels 222, 224.

Referring again to FIG. 1, each panel 222, 224 has a rod 246, 248 disposed in a vertical bore, open at the top, thereon. The rods 246, 248 are impinged by top paddle 50 as top paddle 50 is moved downward. The contact between the top paddle 50 and the rods 246, 248 may be sensed, either by detecting the force of the rods 246, 248 on the top paddle 50 or by detecting a change in the motor torque or the drive wheel speed.

As may be seen in FIG. 1, on each side of the front of the housing there are mounted box proximity detectors 200. The box proximity detectors 200 include whiskers 202 that are each pivotally mounted on the side wall of the housing. Each whisker 202 is provided from a thin sheet of metal, and is thus effectively spring-loaded. When no box is present, the free end of each whisker 202 extends forward of the front face of the housing. In a preferred embodiment, the free end of each whisker 202 extends approximately two inches forward of the face of the housing.

Figure 12:
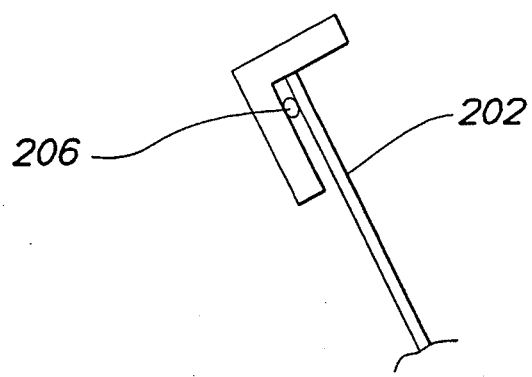
FIG. 12 is a partial right side elevational view of a box proximity detector on a robotic hand according to the invention.

As shown in FIG. 12, there is provided switch 206. Switch 206 may be activated at some point in the travel of whisker 202 between its extended position and its maximum rearward position when the box is in contact with the face of housing 100. For example, switch 206 may be calibrated to be tripped when the tip of whisker 202 is one inch from the face of housing 100.

Figure 10:
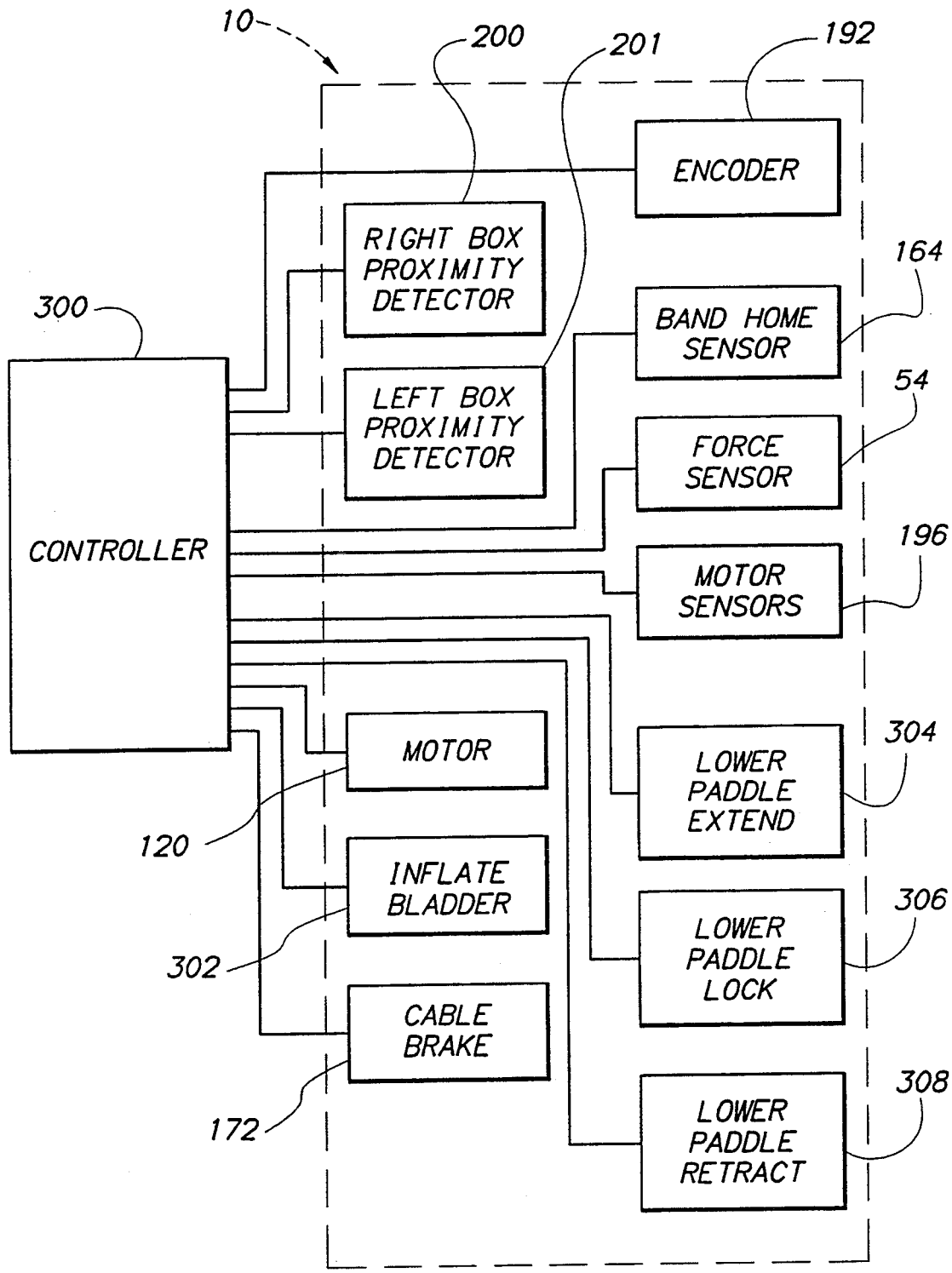
FIG. 10 is a schematic diagram of electrical connections in an apparatus according to the invention.

FIG. 10 is a schematic diagram showing electrical connections of various components of robotic hand 10 to controller 300. Encoder 192, band home sensor 164, top paddle force sensor 54, motor sensors 196 (which may be provided to monitor the current drawn by and hence the torque applied by motor 120), right box proximity detector 200 and left box proximity detector 201, provide information to controller 300 regarding hand 10. Controller 300 provides control signals to motor 120, means 302 for inflating bladders 16, top paddle cable brake 172, control 304 for causing lower paddles 14 to extend, control 306 to cause lower paddles 14 to lock, and control 308 to cause lower paddles 14 to retract.

It will be observed that an apparatus according to the invention includes a number of features that are designed to minimize the possibility of damage to parcels and packages. The retractable metal band which supports the engaging means is flexible in the rearward direction. As a result, if the forward face of the top paddle encounters a parcel or other object while the curled band is extended, the curled band will flex, allowing the top paddle to move rearward. This will minimize any possible damage that could be inflicted by the front edge of the top paddle on packages. The force sensor in the bottom surface of the top paddle can be used in combination with suitable controls to assure that no more than a minimum required force is applied on the top of the package. This also prevents damage to the package. The box proximity detectors provide a signal warning of the presence of a box. If suitable control means are provided, the forward movement of the robotic hand may be slowed when a box is detected. This also minimizes the risk that the housing face will sharply hit and thereby damage a package.

The structure of the lower support means 14 is also advantageous in this regard. The smooth top metal surfaces of the two paddles may slide, with a minimum of jarring, under the package. Thus, the initial engagement occurs with a minimum of movement and minimum of potential for damage. The deployment of the high-friction auxiliary support means minimizes the risk that packages will slide off the support means. The high-friction auxiliary support means also makes it possible to engage the top of the package with a minimum force necessary to maintain the package in position were no such auxiliary support means provided. The package would be resting on a relatively low friction surface. Consequently, a higher pressure would be required to assure that the package would not slip.

The configuration of band 60 and top paddle 50 allows the movement of the robotic hand in confined spaces with band 60 retracted. In particular, small packages can be picked up or set down close to the roof of a trailer or cargo container by a robotic hand according to the invention. Because of the fact that top paddle 50 is on a retractable support, robotic hand 10 can still grip very large packages.

It will be appreciated that there are considerable variations that can be accomplished in an apparatus according to the invention without departing from its scope. As a result, although a preferred embodiment of an apparatus of the invention has been described above, it is emphasized that the invention is not limited to a preferred embodiment and that there exist other alternative embodiments that are fully encompassed within the invention's scope, which is intended to be limited only by the scope of the appended claims.

What is claimed is:

1. A robotic gripper for handling objects of various sizes, comprising:
   (a) means for supporting an article; and
   (b) means for engaging an upper horizontal surface of an article supported on said article supporting means, said engaging means being mounted on an upper free end of means, vertically-deployable above said article supporting means, for supporting said engaging means, said engaging means being so mounted as to move freely in a vertical direction by movement of said engaging means supporting means, wherein said engaging means supporting means comprises a band of sheet-like material, said band being curved about a vertical axis, whereby said band is substantially rigid in a vertical direction and substantially flexible horizontally in a rearward direction.

2. A robotic gripper as recited in claim 1, wherein said engaging means comprises means for sensing a force between said engaging means and an engaged article.

3. A robotic gripper as recited in claim 1, further comprising means for detecting a position of said engaging means.

4. A robotic gripper as recited in claim 1, further comprising a spool having a plurality of sprockets on a face thereof, said band having holes defined therethrough adapted to receive said sprockets, and further comprising means for rotating said spool.

5. A robotic gripper for handling objects of various sizes, comprising:
   (a) means for supporting an article; and
   (b) means for engaging an upper horizontal surface of an article supported on said article supporting means, said engaging means being mounted on an upper free end of means, vertically-deployable above said article supporting means, for supporting said engaging means, said engaging means being so mounted as to move freely in a vertical direction by movement of said engaging means supporting means, wherein said article supporting means is horizontally-movable in a forward direction with respect to said engaging means.

6. A robotic gripper as recited in claim 5, wherein said article supporting means comprises at least one article supporting means member slidably mounted in a sleeve.

7. A robotic gripper as recited in claim 6, wherein said sleeve comprises an inlet for pressurized air at a rearward end thereof, whereby said member is driven forward by introduction of pressurized air in said inlet.

8. A robotic gripper as recited in claim 5, further comprising means attached to said article supporting means for providing operative engagement between said article supporting means and a brake apparatus.

9. A robotic gripper as recited in claim 5, further comprising means for driving said engaging means supporting means.

10. A robotic gripper as recited in claim 5, said robotic gripper further comprising means for detecting the presence of an article so positioned with respect to said robotic gripper as to be supported on said article supporting means and engaged by said upper surface engaging means.

11. A robotic gripper for handling objects of various sizes, comprising:
    (a) means for supporting article; and
    (b) means for engaging an upper horizontal surface of an article supported on said article supporting means, said engaging means being mounted on an upper free end of means, vertically-deployable above said article supporting means, for supporting said engaging means, said engaging means being so mounted as to move freely in a vertical direction by movement of said engaging means supporting means, wherein said article supporting means comprises a first support surface having a relatively low coefficient of friction, and a selectively engagable second support surface having a relatively high coefficient of friction.

12. A robotic gripper as recited in claim 11, wherein said selectively engagable second support surface comprises an inflatable bladder having an outer surface having a high coefficient of friction.

13. A robotic gripper as recited in claim 12, wherein said article supporting means comprises at least one lower support means member, said lower support means member comprising two longitudinal side members each having a substantially planar top surface, each said side member top surface defining a portion of said first support surface of said article supporting means, and said lower support means member further comprising an inflatable bladder disposed between said side members, said bladder being entirely below each said side member top surface when in a deflated condition and projecting above a level of said side member top surface when in an inflated condition.

14. A robotic gripper as recited in claim 13, wherein said bladder comprises on an upper side thereof a high friction pad.

15. A robotic gripper as recited in claim 11, wherein said first support surface comprises smooth metal.

16. A robotic gripper as recited in claim 15, wherein said first support surface comprises aluminum having a low friction surface.

17. A robotic gripper for handling objects of various sizes, comprising:
    (a) means for supporting an article, comprising a first horizontal support surface having a relatively low coefficient of friction, and a selectively engageable second support surface having a relatively high coefficient of friction; and
    (b) means for engaging an upper surface of an article supported on said article supporting means.

18. A robotic gripper as recited in claim 17, wherein said selectively engageable second support surface comprises an inflatable bladder having an outer surface having a high coefficient of friction.

19. A robotic gripper as recited in claim 18, wherein said article supporting means comprises at least one lower support means member, said lower support means member comprising two longitudinal side members each having a substantially planar top surface, each said side member top surface defining a portion of said first horizontal support surface of said article supporting means, said inflatable bladder being disposed inside said side members, said bladder being entirely below said side member top surface when in a deflated condition and projecting above said top surface when in an inflated condition.

20. A robotic gripper for handling objects of various sized, comprising:
    (a) means for supporting an article; and
    (b) means for engaging an upper surface of an article supported on said article supporting means, said engaging means being mounted on an upper free end of a band of sheet-like material, said band being vertically-deployable above said article supporting means and curved about a vertical axis, whereby said band is substantially rigid in a vertical direction and substantially flexible horizontally in a rearward direction.

21. A robotic gripper as recited in claim 20, further comprising a spool having a plurality of sprockets on a face thereof, said band having holes therethrough adapted to receive said sprockets, and further comprising means for rotating said spool.

* * * * *